Aug. 31, 1954
J. O. ALMEN
2,687,653
GEARING
Filed July 14, 1949
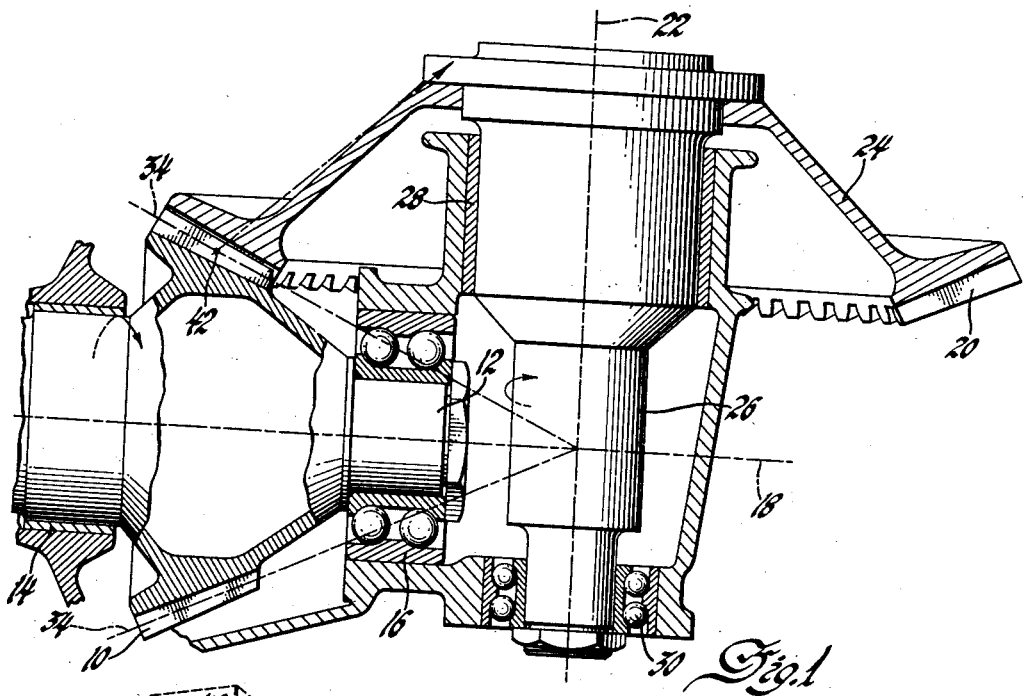
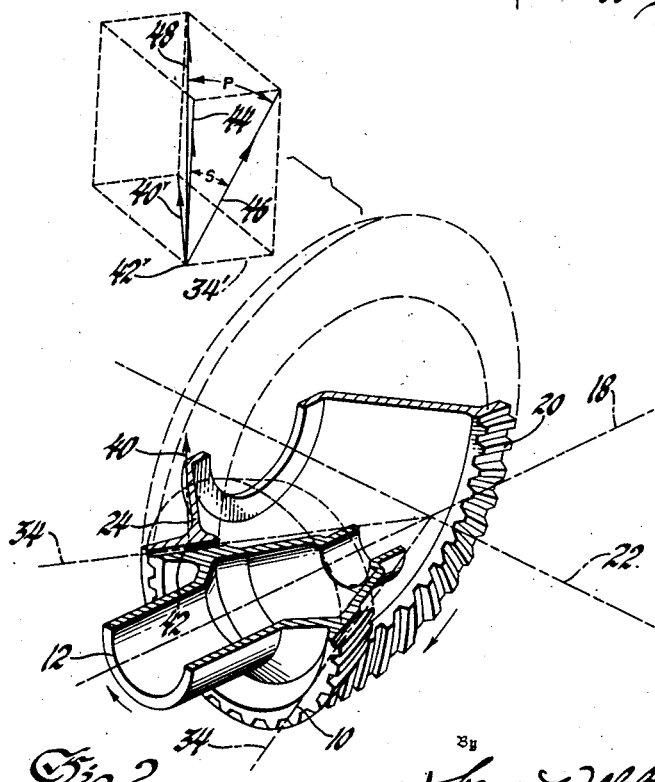
Inventor
John O. Almen
By
Spencer, Willits, Helmig & Baillio
Attorneys Patented Aug. 31, 1954

2,687,653

UNITED STATES PATENT OFFICE 2,687,653

GEARING

John O. Almen, Royal Oak, Mich., assignor to General Motors Corporation, Detroit, Mich., a corporation of Delaware Application July 14, 1949, Serial No. 104,721

10 Claims. (Cl. 74—417)

This invention relates to gearing and more particularly the design of the disc or web of gears to obtain substantially uniform distribution of the load acting on the gear teeth over the entire face width of the gear.

The present practice in gear design appears to be to form the gears and their supporting structural parts sufficiently massive to hold the teeth rigid or without deflection when load is applied to the teeth. This is necessary since the gear load is usually applied in such manner as to concentrate the load on a portion of the gear tooth length because of manufacturing errors and because the summation of deflections of the gear and the supporting structural parts is eccentric to the gear teeth. However, it has been found that stronger gears of less weight can be made if the principle of rigidity is abandoned in favor of the principle of controlled elasticity. This can be accomplished if the gear web and rim of a gear and pinion set are made sufficiently elastic, and if they are so located with respect to one another that they will deflect in the direction to uniformly distribute the load across the width of the teeth, and the gear web is made in substantial alignment to the resultant of the tooth load passing through the shaft axis, so that the thin gear web will support the tooth load. In spur gearing a thin radial web is employed which is joined to the rim at its center. The thin web or disc deflects to allow angular or radial movement of the tooth to evenly distribute the tooth pressures. When gears having their teeth angularly related to the axis of rotation, such as helical, spiral, bevel, spiral bevel or hypoid gears, are employed, the resultant of the tooth forces is not perpendicular to the axis of rotation. Thus a bending load is exerted on the conventional radial gear disc which will cause a large deflection. To control this deflection or to allow the use of thinner disc sections the disc should be positioned substantially in alignment with the resultant force acting on the gear teeth and passing through the axis of the gear. In order to correct for deflection loads the diameter at which the disc is joined to the bevel or spiral bevel gear should be smaller than the theoretical diameter of load application on the gear.

The object of this invention is to provide an improved gear web which is sufficiently flexible to obtain uniform distribution of the load acting on the gear teeth over the entire face width of the gear with maximum lateral stability.

Another object of this invention is to produce in an improved gear having teeth angularly related to the axis of the gear a supporting disc with the material obtimumly disposed to support the maximum load.

Another object of the invention is to provide an improved gear disc or wheel with the elements located in substantial alignment with the component of the resultant tooth load at the point of contact for gears having teeth angularly related to the axis of the gear.

Another object of the invention is to provide a spiral bevel gear with the tooth supporting disc or wheel having its element to the point of tooth contact substantially in alignment with the resultant tooth load force through the point of contact and in the plane of the axes of the meshing spiral bevel gears.

Another object of the invention is to provide a bevel gear having a tooth rim joined to the conical disc inside the theoretical load application circle of the gear teeth and having the resultant tooth load passing through the gear axis in substantial alignment and substantially parallel to the elements of the conical disc.

These and other objects of the invention will be apparent from the following description and drawings.

In the drawings, Figure 1 is a meshing pair of spiral bevel gears.

Figure 2 is an isometric view of the spiral bevel gears showing the tooth load forces.

The invention is illustrated in connection with aircraft propeller shaft drives where large amounts of power must be transmitted with lightweight gearing. In these applications the disc is flexible to obtain substantially uniform distribution of the load acting on the gear teeth over the entire width of the gear, and this material in the gear disc is positioned to support the load with a minimum of lateral deflection. The driving pinion 10 is formed integrally with the hollow stub shaft 12, which is supported in the plain bearing 14, and a thrust bearing 16. The driving pinion 10 rotates about its axis 18 and meshes with driven gear rim and teeth 20, which rotates about its axis 22 located at right angles to and intersecting axis 18. The gear rim 20 is supported by a conical disc 24 suitably secured to the shaft 26, which is supported in the plain bearing 28 and the thrust bearing 30. All the bearings are supported by a suitable housing not shown. The conical disc 24 may be considered to be formed of a plurality of elements extending from an apex to the circular base in accordance with basic Euclidean principles.

In order to properly locate the disc 24 of the bevel gear the direction of the resultant force 40 in the plane of the gear and pinion axes or the resultant passing through the gear axis must be determined. The isometric view showing the gears, the axes and the cone angle, and force vectors is shown in Figure 2. The axis 18 of the driving pinion and the axis 22 of the driven gear meet at right angles. The pitch cone line 34 is in the plane of the axes 18 and 22 and passes through the design point of contact 42 on the pinion gear teeth, and makes an angle with the pinion axis equal to half the pitch cone angle, or an angle whose tangent is the gear ratio of the pinion to the gear.

The vectors act through the point of contact 42 on the pitch cone line, but for the sake of clarity so that the vectors do not overlay the gears, the vector diagram has been drawn through the displaced contact point 42'. As pointed out above Figure 2 is an isometric view and thus the gear axes 18 and 22 which are at right angles to each other are illustrated at an angle to each other to produce the perspective effect. The force diagram which is a right parallelepiped was illustrated in this view to show the complete force diagram in a single view. Thus it will be seen that adjacent faces of the force diagram parallelepiped are at right angles to each other. It is also pointed out that each face of the parallelepiped may be considered a force diagram or parallelogram having a right parallelogram form.

The vector 44 which represents the torque force and is equal to the torque divided by the radius of point 42 about axis 18 is drawn from point 42' perpendicular to the plane of the axes 18 and 22. Since the pinion is moving clockwise as indicated by the arrow in Figure 2, the force vectors are drawn above the plane of the axes. In the plane of vector 44 and pitch cone line 34 a vector 46 is drawn perpendicular to the tooth surface at the contact point 42'. The angle S between vectors 44 and 46 is the spiral angle. The force parallelogram formed by the vectors 44 and 46 has a base 34' which is merely the cone line 34 displaced for clarity. The other end or top of the force parallelogram is parallel to the line 34'. The vector 48, which represents the resultant tooth load is drawn in a plane through vector 46 and perpendicular to the plane of vectors 44 and 46, and makes an angle P equal to the tooth pressure angle with vector 46. The vector 48 is then projected into the plane of the axis of the gears to give vector 40', the resultant horizontal tooth load. The vector 40' is shown in the displaced position relative to displaced contact point 42'. The tooth load vector 40 is shown in the proper relative position to the gears in Figure 2. The radial elements of the disc 24 are made in substantial alignment with the vector of the resultant horizontal tooth load. In order to simplify the above description, the disc or web 24 has been considered to be a plane or to have no thickness so that the element or generatrix would be a straight line. Though the element or generatrix would technically be a plane when the thickness of the disc is considered, the central element or median of this generatrix plane is normally and in this case referred to as the element of the disc. Thus the disc 24 for the gear is subject to a minimum bending force and will have a minimum deflection. It is also pointed out that the strength of bevel gear teeth is less at their small ends than at their large ends. For this reason the distribution of the load on bevel gears should not be about the geometric mid-point but about the mid-point of the tooth in relation to its beam strength.

Tests of a conical disc indicated that the deflection of a point inside the projected conical surface is very much greater than that of a point outside the projected surface for the same tangential load applied to the end of a tooth. From these relative deflections it became apparent that for a tangential load applied on the conical surface, a line representing the flank of a tooth face, would be tilted at an angle to the mating tooth, causing the contact to shift toward the heel of the tooth or the end having the larger diameter. By applying the load at a point outside the projected cone surface, the moment caused by this displacement of the load will be in such direction as to compensate for this deflection. The conical disc 24 may be connected to the rim 20 to create a moment tending to shift the contact point of the same value as the moment caused by the tooth load, so that they balance to maintain the load at the center of the tooth, so that the deflection of the tooth will be parallel to itself. Thus as shown in Figure 1 the conical web 24 is connected to the rim 20 at a point inside the theoretical point of contact 42 and the resultant 40 which passes through the gear axis 18. The theoretical point of contact at the center of the tooth is also the point of origin for the vectors indicating the loads on the tooth. In general the elements of the conical disc 24 are connected to the gear rim 20 midway between the theoretical point of contact at the center and the toe or smaller diameter end of the teeth, and are connected to the shaft at the point where the resultant vector 40 intersects the shaft 26 or axis 22, and thus the mean element of the disc and the resultant vector 40 are substantially in alignment and parallel.

It will be seen that this invention can also be applied to other types of gears with angularly directed loads. Thus in spiral or helical spur gears the gear web should have a similar conical shape with the elements of the cone in substantial alignment with the resultant force on the gear web directed toward the axis of the gear. In the normal helical spur gears with parallel shafts the resultant of the separating force, the tangential force and the thrust force is in the plane of these shafts. These forces are calculated by either trigonometry or by vector analysis. The latter type of solution for helical gears is similar to the vector solution for spiral bevel gears shown in the above specification and drawings except that the helical gears have no cone angle. In plain bevel gears the elements of the web may also be in substantial alignment with the resultant tooth load in the plane of the axes. The resultant is determined in the same manner as for the spiral bevel gears, but the vector is not tilted for the spiral angle since the teeth contact will be on the pitch cone line 34. In spur gears the disc is positioned radially and meets the gear rim at the center of the teeth. The disc has a thin section so that the disc may bend to allow the teeth to displace to relieve concentrations of tooth pressure forces and to evenly distribute these forces over the entire width of the teeth.

The above described specific embodiment illustrates the principles of the invention. Numerous applications may be made within the scope of the appended claims.

I claim:

1. In a gear assembly, a first gear having gear teeth and a web, a second gear meshing with said first gear, said first gear teeth being substantially uniformly angularly disposed to the axis of said gear, the resultant tooth load vector extending from the design point of contact located between said gear teeth through said axis and being angularly related to said axis, and said web having elements in substantial alignment with said resultant tooth load.

2. In a gear assembly, a gear having teeth and a web, said gear teeth being unidirectional spiral gear teeth, a pinion, said gear meshing with the pinion, the axes of said gear and pinion defining a plane, and the web of said gear having elements located substantially coincident to the resultant tooth load vector in the plane of said axes.

3. In a gear assembly, a gear having gear teeth and a web, said gear teeth being unidirectional spiral bevel gear teeth, a pinion, said gear meshing with the pinion, the axes of said gear and pinion defining a plane, and the web of said gear having elements located substantially coincident to the resultant tooth load vector in the plane of said axes.

4. In a gear assembly, a first bevel gear having a rim and a web, a second gear meshing with said first gear, said first gear having unidirectional angularly positioned teeth on the rim, said web having elements in substantial alignment with the resultant tooth load vector passing through the axis of said first gear and in the plane defined by the axes of said gears, and said web being joined to the rim of said first gear at a diameter smaller than the diameter of the theoretical tooth contact points.

5. In a gear having teeth and a web, said gear teeth being unidirectional spiral gear teeth, said gear meshing with a pinion, the axes of said gear and pinion defining a plane, the web of said gear having elements located substantially coincident to the resultant tooth load vector in the plane of said axes, and said elements passing within said resultant tooth load vector at the teeth.

6. In a gear having gear teeth and a web, said gear teeth being spiral bevel gear teeth, said gear meshing with a pinion, the axes of said gear and pinion defining a plane, the web of said gear having elements located substantially coincident to the resultant tooth load vector in the plane of said axes, and said element passing within said resultant tooth load vector at the tooth.

7. In a gear assembly, a first gear having gear teeth, a rim and a conical web, a second gear meshing with said first gear, said gear teeth of said first gear being angularly disposed to the axis of said gear and positioned on said rim, and said conical web of said first gear being joined to said gear rim at a diameter smaller than the theoretical diameter of load application on the teeth.

8. In a gear assembly, a first gear having unidirectional angularly positioned gear teeth and a web, a second gear, said first gear meshing with said second gear, said web having elements in substantial alignment with the resultant tooth load vector passing through the axes of said gears, and said elements passing through said teeth at a smaller diameter than said vector.

9. In a gear having gear teeth and a conical web, said teeth being at a cone angle and at a pitch angle to said gear axis, said web being in substantial alignment with the resultant tooth load vector which passes through the gear axis, and said web having sufficient flexibility to deflect under the tooth load to insure substantially uniform distribution of the tooth contact forces over the face of said teeth.

10. In a gear assembly, a first gear having gear teeth and a conical web, a second gear meshing with said first gear, said gear teeth of said first gear being mounted on a rim, said conical web having a thickness substantially less than the width of said rim permitting deflection of said gear web and teeth, said gear teeth and said rim being secured to said conical web with the conical web and the projection of the conical web through said gear teeth displaced toward the first gear axis within the theoretical point of load application on the teeth a distance providing a moment to balance the moment caused by the normal displacement of the point of load application on the teeth due to the deflection of the conical web.

References Cited in the file of this patent

UNITED STATES PATENTS

| Number | Name | Date |
| --- | --- | --- |
| 1,323,282 | Horton | Dec. 2, 1919 |
| 1,900,452 | Ledeen | Mar. 7, 1933 |
| 1,949,643 | Bannan | Mar. 6, 1934 |
| 2,002,310 | Christman | May 21, 1935 |
| 2,516,077 | Schmitter | July 18, 1950 |

FOREIGN PATENTS

| Number | Country | Date |
| --- | --- | --- |
| 884,461 | France | Apr. 27, 1943 |